(12) United States Patent
Li et al.

(10) Patent No.: US 11,733,502 B2
(45) Date of Patent: Aug. 22, 2023

(54) SPATIAL POSTURE ADJUSTING DEVICE FOR OPTICAL AXIS OF MICROSCOPIC MONITORING SYSTEM FOR CELLULAR FERMENTATION TANK

(71) Applicant: Changchun University of Science and Technology, Changchun (CN)

(72) Inventors: Qi Li, Changchun (CN); Jinming Liu, Changchun (CN); Yang Xiang, Changchun (CN); Xu Ning, Changchun (CN); He Zhang, Changchun (CN); Shuai Yan, Changchun (CN)

(73) Assignee: CHANGCHUN UNIVERSITY OF SCIENCE AND TECHNOLOGY, Changchun (CN)

( * ) Notice: Subject to any disclaimer, the term of this patent is extended or adjusted under 35 U.S.C. 154(b) by 326 days.

(21) Appl. No.: 16/928,188

(22) Filed: Jul. 14, 2020

(65) Prior Publication Data
US 2021/0018739 A1   Jan. 21, 2021

(51) Int. Cl.
*G02B 21/00* (2006.01)
*G02B 21/06* (2006.01)
*G02B 21/24* (2006.01)

(52) U.S. Cl.
CPC ............. *G02B 21/24* (2013.01); *G02B 21/06* (2013.01)

(58) Field of Classification Search
CPC ............ G02B 21/00; G02B 21/0004; G02B 21/0032; G02B 21/06; G02B 21/24; G02B 21/242

USPC .................................................. 359/368–398
See application file for complete search history.

(56) References Cited

U.S. PATENT DOCUMENTS 5,477,443 A * 12/1995 Cvek .................. F16M 11/2092
                                                                362/427
5,748,366 A *  5/1998 Yasunaga ........... G02B 21/0012
                                                                359/368

* cited by examiner

*Primary Examiner* — Thong Q Nguyen
(74) *Attorney, Agent, or Firm* — Wenderoth, Lind & Ponack, L.L.P.

(57) ABSTRACT

The present invention discloses a spatial posture adjusting device for an optical axis of a microscopic monitoring system for a cellular fermentation tank. The adjusting device includes a base frame, where the base frame is fixedly provided with an up/down adjustment table; the up/down adjustment table is slidably connected to a load plate; the load plate is fixedly provided with a microscope adjustment mechanism and an illumination rotation adjustment mechanism in sequence; the illumination rotation adjustment mechanism includes a base; the base is fixedly connected to a first support frame; the first support frame is fixedly provided with an illuminator; the microscope adjustment mechanism includes a second support frame; the second support frame is fixedly provided with a clamping device; the clamping device is fixedly provided with a microscope device; the illumination rotation adjustment mechanism is fixedly connected with a mobile platform.

6 Claims, 3 Drawing Sheets

SPATIAL POSTURE ADJUSTING DEVICE FOR OPTICAL AXIS OF MICROSCOPIC MONITORING SYSTEM FOR CELLULAR FERMENTATION TANK

TECHNICAL FIELD

The present invention relates to the field of biomedical engineering, in particular to a spatial posture adjusting device for an optical axis of a microscopic monitoring system for a cellular fermentation tank.

BACKGROUND

The axes of the video microscope and the fixed light source need to be precisely adjusted in the monitoring process of the cellular fermentation tank. If there is a deviation or poor matching between the two axes, it will cause a series of problems such as deviations in culture cell recognition and unsuccessful matching of image templates, resulting in unstable testing. In the prior art, the posture adjusting device for the optical axis of the monitoring system of the cellular fermentation tank is assembled by the existing optical adjustment frame and mechanical adjustment table, which is prone to mismatching between the lens interface and the illumination interface. For example, since the current commercial optical adjustment frame lacks a corresponding clamping device to clamp the lens barrel of the Φ40 mm lens, it is necessary to connect the lens barrel in a transitional manner. However, the transitional connection will lead to an angular error between the optical axis and the reference plane of the adjustment table, causing angle coupling and redundancy in the spatial dimension adjustment performed by the adjustment table.

In addition, the assembly of the existing optical adjustment frame and mechanical adjustment table is cumbersome and unstable for the adjustment of the monitoring system of the cellular fermentation tank. The adjustment table varies with different locking and fine-tuning mechanisms, circuits and drivers, which makes the cell image alignment and recognition process too complicated.

The assembly of the existing optical adjustment frame and mechanical adjustment table has poor accuracy. The adjustment table is a general mechanism with low accuracy, and the optical adjustment frame is too redundant to adjust the spatial posture of the optical axis requiring angular adjustment above the gradation. Moreover, the adjustment frame also varies with different mechanical references and positioning interfaces, resulting in that the microscope lens and the illumination end are not well matched and the adjustment process is cumbersome and unstable, which directly leads to the low stability of the cell monitoring process.

SUMMARY

In order to solve the above problems existing in the prior art, an objective of the present invention is to provide a spatial posture adjusting device for an optical axis of a microscopic monitoring system for a cellular fermentation tank.

To achieve the above objective, the present invention provides the following solutions. The present invention provides a spatial posture adjusting device for an optical axis of a microscopic monitoring system for a cellular fermentation tank, including a base frame, where the base frame is fixedly provided with an up/down adjustment table; the up/down adjustment table is slidably connected to a load plate; the load plate is fixedly provided with a microscope adjustment mechanism and an illumination rotation adjustment mechanism in sequence; the illumination rotation adjustment mechanism includes a base; the base is fixedly connected to a first support frame; the first support frame is fixedly provided with an illuminator; an outer surface of the illuminator is sleeved with a three-axis revolving mandrel; the three-axis revolving mandrel is axially connected to a joint bearing; the microscope adjustment mechanism includes a second support frame; the second support frame is fixedly provided with a clamping device; the clamping device is fixedly provided with a microscope lens; the illumination rotation adjustment mechanism is fixedly connected with a mobile platform.

Preferably, the illumination rotation adjustment mechanism is axially connected to a hand wheel.

Preferably, the up/down adjustment table includes a first motor and a first sliding rail; the first motor is axially connected with a first screw; the first screw is threaded with a sliding plate; both ends of the sliding plate are slidably connected with the first sliding rail; the sliding plate is axially connected with the load plate; the sliding plate is provided with a plurality of through holes; the load plate is provided with a plurality of through grooves.

Preferably, the mobile platform includes a second motor; the second motor is axially connected with a second screw; the second screw is threaded with the base; both ends of the base are slidably connected with a second sliding rail.

Preferably, the first support frame includes a first support plate, a second support plate and a third support plate; the first support plate is fixedly connected to the second support plate; one end of the third support plate is connected with the first support plate, and the other end of the third support plate is connected with the second support plate.

Preferably, an included angle between the first support plate and the second support plate ranges from 60° to 90°.

The present invention discloses the following technical effects. According to the size of different cellular fermentation tanks, the present invention adjusts the telescopic movement of the mobile platform to adjust the distance between an illumination end and the microscope lens to realize left/right movement, and adjusts the up/down adjustment table to realize the up/down movement of the optical axis. The present invention adjusts a revolving angle of the load plate and adjusts the optical axis of the microscope lens, so that the to-be-monitored cells fall in the center of the field of view (FOV) and are moved back and forth by adjusting the base frame. The present invention adjusts the hand wheel to realize the adjustment of the elevation angle and azimuth direction of the illumination end by relying on the rotation freedom of the high-precision joint bearing. In this way, the present invention makes the to-be-monitored cells coaxial with the optical axis of the microscope lens, and makes the light field of the monitored cells uniform and full to improve the adjustment accuracy of the optical axis, thereby improving the accuracy of cell recognition and monitoring.

BRIEF DESCRIPTION OF DRAWINGS

To describe the technical solutions in the examples of the present invention or in the prior art more clearly, the accompanying drawings required for the examples are briefly described below. Apparently, the accompanying drawings in the following description show merely some examples of the present invention, and a person of ordinary skill in the art may still derive other accompanying drawings from these accompanying drawings without creative efforts.

Figure 1:
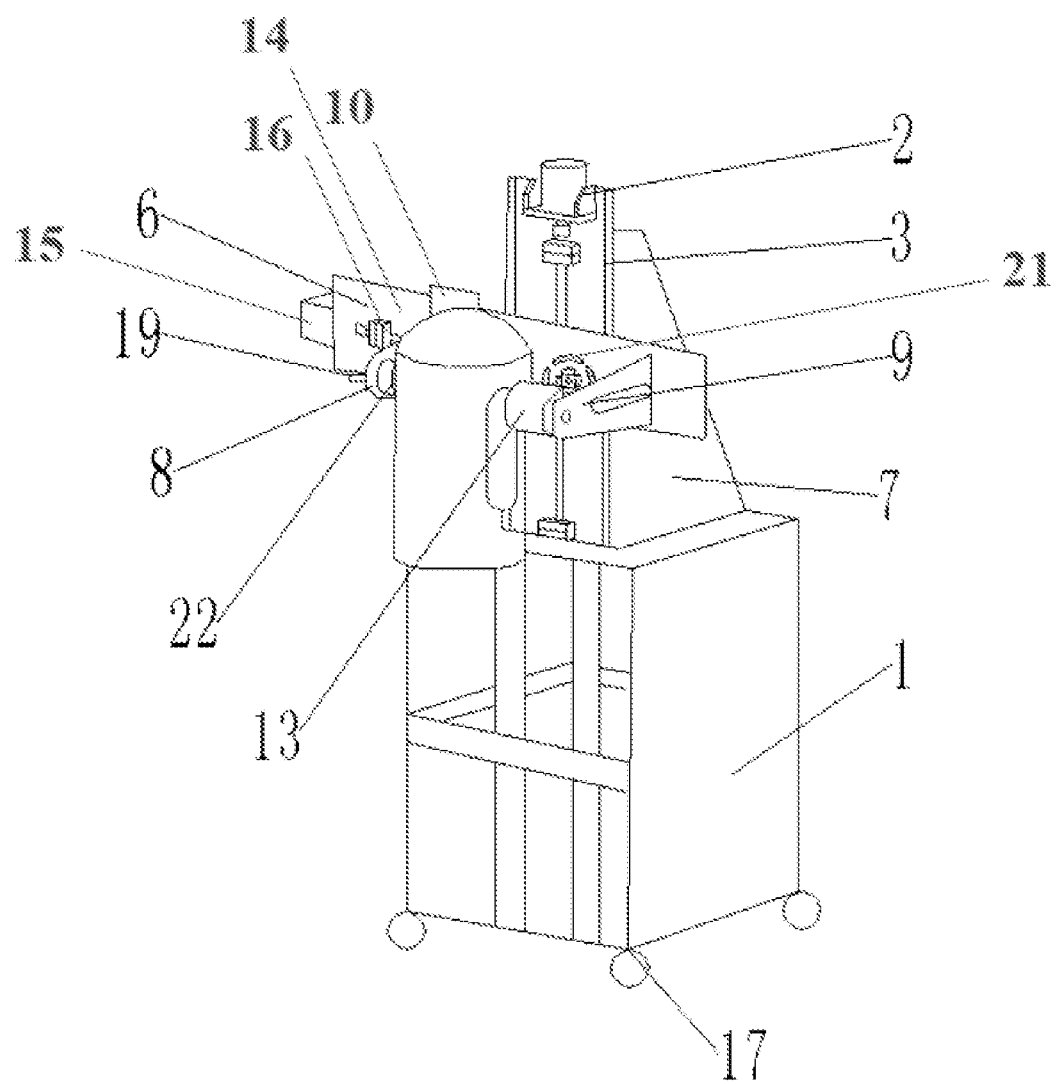
FIG. 1 is a structural diagram of the present invention.
Figure 2:
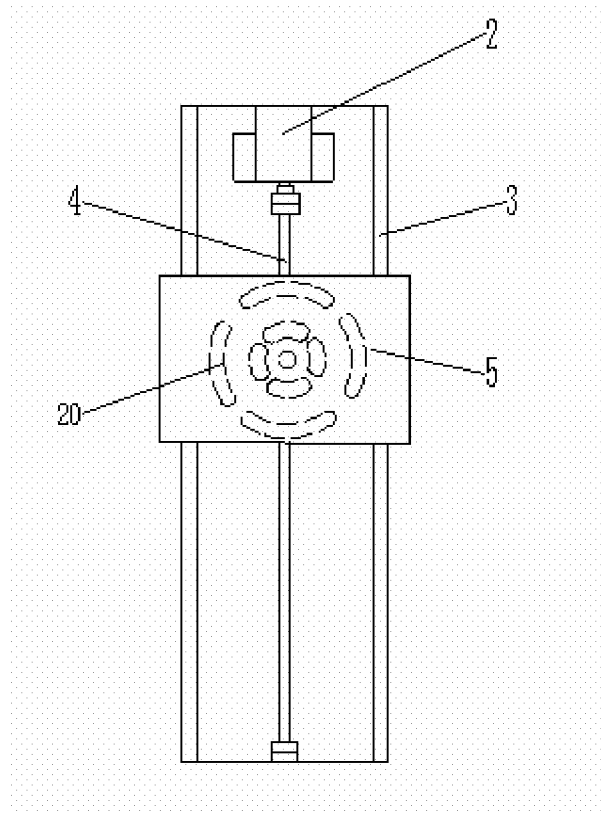
FIG. 2 is a front view of an up/down adjustment table of the present invention.
Figure 3:
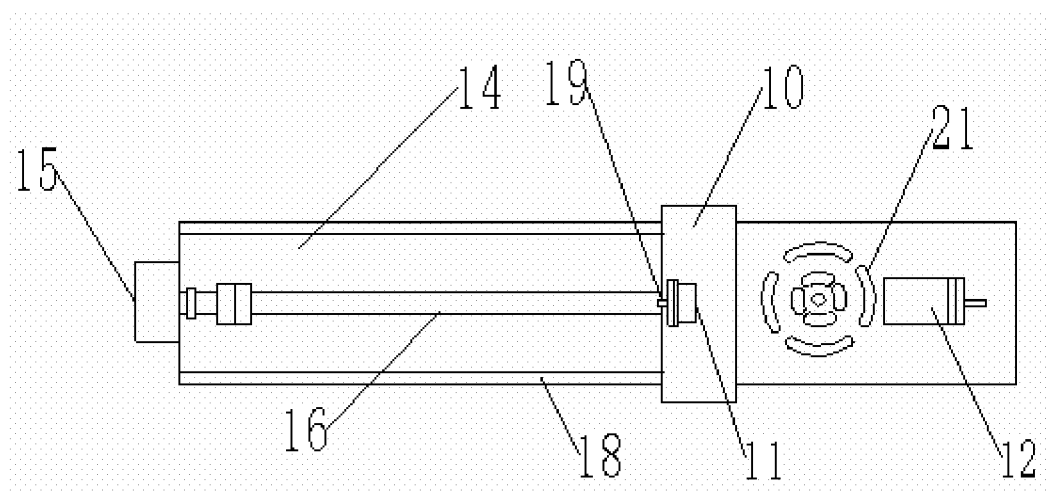
FIG. 3 is a front view of a load plate of the present invention.
Figure 4:
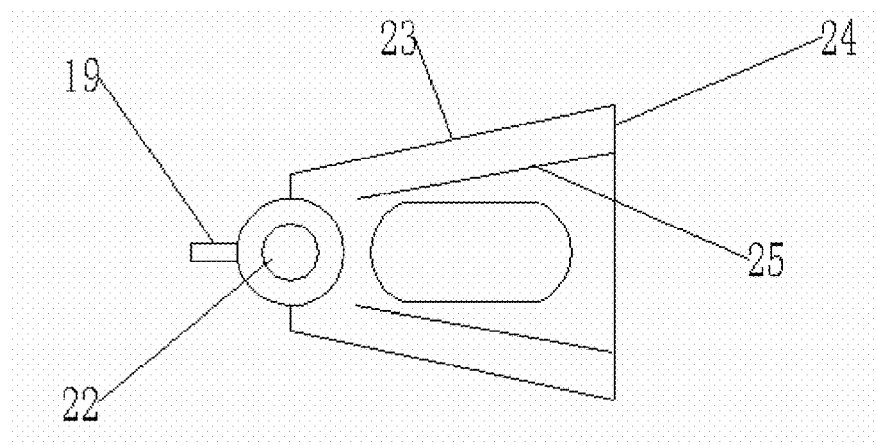
FIG. 4 is a front view of an illumination rotation adjustment mechanism of the present invention.
Figure 5:
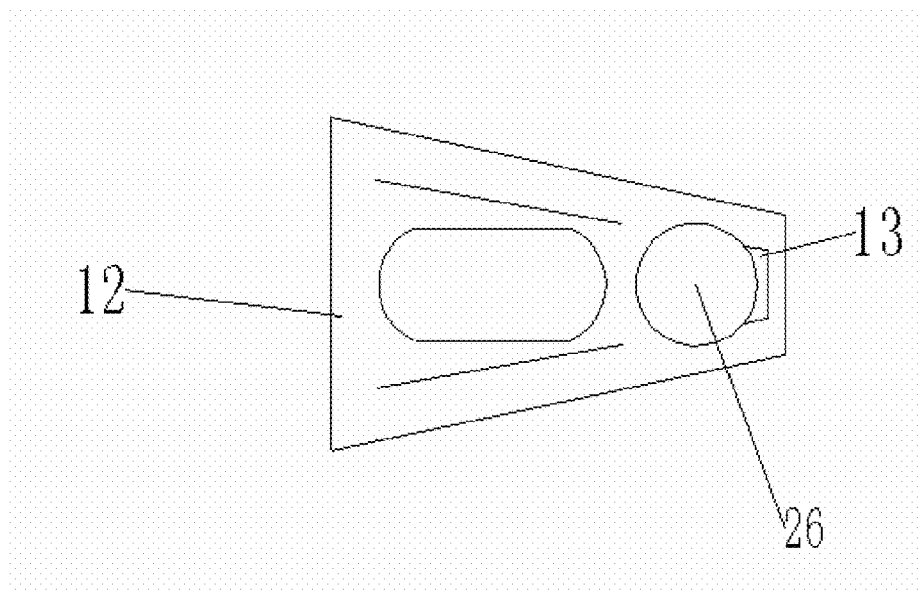
FIG. 5 is a front view of a microscope adjustment mechanism of the present invention.

Reference Numerals: 1. base frame; 2. first motor; 3. first sliding rail; 4. first screw; 5. sliding plate; 6. load plate; 7. up/down adjustment table; 8. illumination rotation adjustment mechanism; 9. microscope adjustment mechanism; 10. base; 11. first support frame; 12. second support frame; 13. clamping device; 14 mobile platform; 15. second motor; 16. second screw; 17. universal wheel; 18. second sliding rail; 19. hand wheel; 20. through hole; 21. through groove; 22. illuminator; 23. first support plate; 24. second support plate; 25. third support plate; and 26. microscope lens.

DETAILED DESCRIPTION

The technical solutions in the examples of the present invention are clearly and completely described below with reference to the accompanying drawings in the examples of the present invention. Apparently, the described examples are merely a part rather than all of the examples of the present invention. All other examples obtained by a person of ordinary skill in the art based on the examples of the present invention without creative efforts should fall within the protection scope of the present invention.

To make the objectives, features and advantages of the present invention more apparent and comprehensible, the present invention is described in more detail below with reference to the accompanying drawings and specific implementations.

Referring to FIGS. 1 to 5, the present invention provides a spatial posture adjusting device for an optical axis of a microscopic monitoring system for a cellular fermentation tank. The adjusting device includes a base frame 1. The base frame 1 is fixedly provided with an up/down adjustment table 7. The up/down adjustment table 7 is slidably connected to a load plate 6, and the up/down adjustment table 7 moves up and down to drive the load plate 6 to move up and down. The load plate 6 is fixedly provided with a microscope adjustment mechanism 9 and an illumination rotation adjustment mechanism 8 in sequence. The cellular fermentation tank is fixed between the microscope adjustment mechanism 9 and the illumination rotation adjustment mechanism 8. The position of the cellular fermentation tank is adjusted, so that the microscope adjustment mechanism 9, the illumination rotation adjustment mechanism 8 and to-be-monitored cells in the cellular fermentation tank are on a same horizontal line. The illumination rotation adjustment mechanism 8 includes a base 10. The base 10 is fixedly connected to a first support frame 11. The first support frame 11 is fixedly provided with an illuminator 22. An outer surface of the illuminator 22 is sleeved with a three-axis revolving mandrel. The three-axis revolving mandrel is axially connected to a hand wheel 19 and a joint bearing to adjust an elevation angle of the illuminator 22. The microscope adjustment mechanism 9 includes a second support frame 12. The second support frame 12 is fixedly provided with a clamping device 13. The clamping device 13 is fixedly provided with a microscope lens 26.

Further, the illumination rotation adjustment mechanism 8 is axially connected to the hand wheel 19. The hand wheel 19 is adjusted, so that an optical axis of the microscope lens is coaxial with the to-be-monitored cells, and a light field of the monitored cells is uniform and full. The illumination rotation adjustment mechanism 8 is fixedly connected to a mobile platform 14.

Further, the up/down adjustment table 7 includes a first motor 2 and a first sliding rail 3. The first motor 2 is axially connected with a first screw 4. The first screw 4 is threaded with a sliding plate 5. Both ends of the sliding plate 5 are slidably connected with the first sliding rail 3. The sliding plate 5 is axially connected with the load plate 6. The first motor 2 drives the first screw 4 to rotate, and the screw drives the sliding plate 5 to move up and down on the first sliding rail 3, thereby driving the load plate 6 to move up and down. The sliding plate 5 is provided with a plurality of through holes 20, and the load plate 6 is provided with a plurality of through grooves 21. The through holes 20 are fixed with the through grooves 21 through a pin. This device realizes the rotation of the load plate 6.

Further, the mobile platform 14 includes a second motor 15. The second motor 15 is axially connected with a second screw 16. The second screw 16 is threaded with the base 10. Both ends of the base 10 are slidably connected with a second sliding rail 18. The second motor 15 drives the second screw 16 to rotate, thereby driving the mobile platform 14 to move in the left and right. In this way, the device adjusts the distance between the illumination rotation adjustment mechanism 8 and the microscope device to adapt to cellular fermentation tanks with different diameters.

Further, the first support frame 11 includes a first support plate 23, a second support plate 24 and a third support plate 25. The first support plate 23 is fixedly connected to the second support plate 24. One end of the third support plate 25 is connected with the first support plate 23, and the other end of the third support plate 25 is connected with the second support plate 24. In this way, the device realizes the support of the illumination rotation adjustment mechanism 8.

Further, an included angle between the first support plate 23 and the second support plate 24 ranges from 60° to 90°.

Further, the bottom of the base frame 1 is axially connected to a universal wheel 17 to realize the movement of the whole device from front to back, so as to facilitate the control of the distance between the base frame 1 and the cellular fermentation tank.

Figure 6:
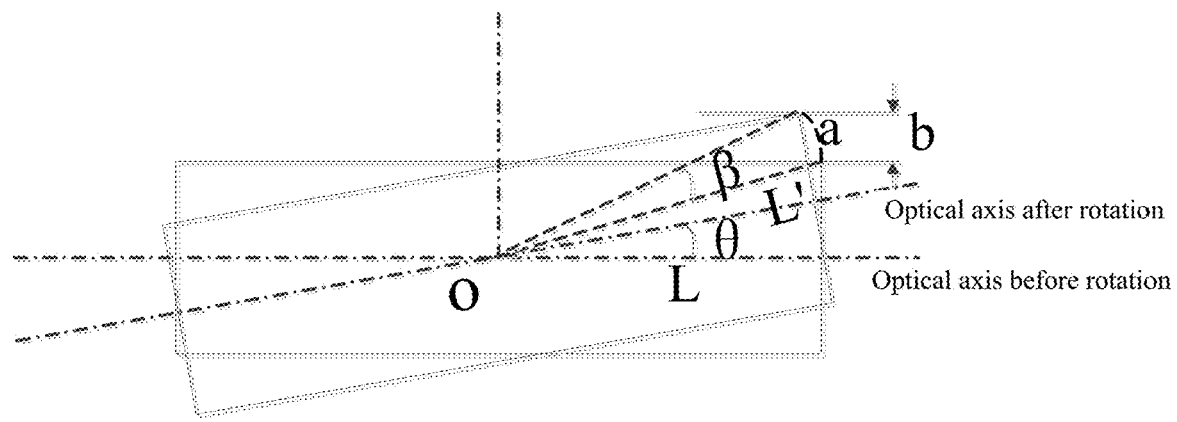
FIG. 6 is a schematic diagram of rotation of the illumination rotation adjustment mechanism according to the present invention.

As shown in FIG. 6, a rotation angle of the illumination end is θ. According to the angle relationship shown in the figure, θ=β. Because the rotation angle is small, a rotation arc length a≈b, tan β=a/L'=b/L', b=3 mm, L=115 mm, then β≈0.026=1.5°. Therefore, the illumination end can achieve the adjustment of elevation angle and azimuth direction within 1.5°.

The rotation angle of the illumination end is θ. According to the angle relationship shown in the figure, θ=β. Because the rotation angle is very small, tan β=R/L. R is realized by a push rod of the hand wheel 19, and a thread pitch of the push rod of the hand wheel 19 is 0.1 mm. L=350 mm, β≈0.0003=1'.

It should be understood that in the description of the present invention, terms such as "longitudinal", "transverse" "upper", "lower", "front", "rear", "left", "right", "vertical", "horizontal", "top", "bottom", "inside" and "outside" indicate the orientation or position relationships based on the drawings. They are merely intended to facilitate description of the present invention, rather than to indicate or imply that the mentioned device or elements must have a specific orientation and must be constructed and operated in a specific orientation. Therefore, these terms should not be construed as a limitation to the present invention.

The examples described above are only intended to describe the preferred examples of the present invention, and are not intended to limit the scope of the present invention. Various modifications and improvements performed on the technical solution of the present invention by those of ordinary skill in the art without departing from the design spirit of the present invention should fall within the protection scope as defined by the claims of the present invention.

What is claimed is:

1. A spatial posture adjusting device for an optical axis of a microscopic monitoring system for a cellular fermentation tank, comprising a base frame (1), wherein the base frame (1) is fixedly provided with an up/down adjustment table (7); the up/down adjustment table (7) is slidably connected to a load plate (6); the load plate (6) is fixedly provided with a microscope adjustment mechanism (9) and an illumination rotation adjustment mechanism (8) in sequence; the illumination rotation adjustment mechanism (8) comprises a base (10); the base (10) is fixedly connected to a first support frame (11); the first support frame (11) is fixedly provided with an illuminator (22); an outer surface of the illuminator (22) is sleeved with a three-axis revolving mandrel; the three-axis revolving mandrel is axially connected to a joint bearing; the microscope adjustment mechanism (9) comprises a second support frame (12); the second support frame (12) is fixedly provided with a clamping device (13); the clamping device (13) is fixedly provided with a microscope lens (26); the illumination rotation adjustment mechanism (8) is fixedly connected with a mobile platform (14), wherein the mobile platform (14) comprises a second motor (15), the second motor (15) is axially connected with a second screw (16), the second screw (16) is threaded with the base (10), both ends of the base (10) are slidably connected with a second sliding rail (18).

2. The spatial posture adjusting device for an optical axis of a microscopic monitoring system for a cellular fermentation tank according to claim 1, wherein the illumination rotation adjustment mechanism (8) is axially connected to a hand wheel (19).

3. The spatial posture adjusting device for an optical axis of a microscopic monitoring system for a cellular fermentation tank according to claim 1, wherein the up/down adjustment table (7) comprises a first motor (2) and a first sliding rail (3); the first motor (2) is axially connected with a first screw (4); the first screw (4) is threaded with a sliding plate (5);

both ends of the sliding plate (5) are slidably connected with the first sliding rail (3); the sliding plate (5) is axially connected with the load plate (6); the sliding plate (5) is provided with a plurality of through holes (20); the load plate (6) is provided with a plurality of through grooves (21).

4. The spatial posture adjusting device for an optical axis of a microscopic monitoring system for a cellular fermentation tank according to claim 1, wherein the first support frame (11) comprises a first support plate (23), a second support plate (24) and a third support plate (25); the first support plate (23) is fixedly connected to the second support plate (24); one end of the third support plate (25) is connected with the first support plate (23), and thean other end of the third support plate (25) is connected with the second support plate (24).

5. The spatial posture adjusting device for an optical axis of a microscopic monitoring system for a cellular fermentation tank according to claim 4, wherein an included angle between the first support plate (23) and the second support plate (24) ranges from 60° to 90°.

6. The spatial posture adjusting device for an optical axis of a microscopic monitoring system for a cellular fermentation tank according to claim 1, wherein a bottom of the base frame (1) is axially connected to a universal wheel (17).

\* \* \* \* \*